Sept. 26, 1939.  W. GENEST ET AL  2,174,209

VIBRATION DAMPER

Filed Jan. 3, 1938

Inventor
Werner Genest,
Helmut Hartz,

By D. P. Wachaufel
Attorney

Patented Sept. 26, 1939

2,174,209

UNITED STATES PATENT OFFICE 2,174,209

VIBRATION DAMPER

Werner Genest, Berlin-Steglitz, and Helmut Hartz, Berlin-Rudow, Germany; said Hartz assignor to said Genest Application January 3, 1938, Serial No. 183,194

2 Claims. (Cl. 248—20)

This invention relates to vibration dampers, and more particularly to an improvement which facilitates installation.

Vibration dampers are constructed to meet special conditions. That is to say, they are designed and constructed at the place of manufacture to meet certain specifications of use depending upon the frequency of vibrations in the particular piece of machinery in connection with which they are used. Therefore, it is desirable from the standpoint of installation that the damper be preserved in the same condition and assembly as it was at the time of manufacture, so as to avoid the necessity of reassembling it at the installation site.

Accordingly, a primary object of the invention is to provide a vibration damping unit including base and cap members, or abutments, which may be given a predetermined spacing, to place the elastic member under pre-determined load corresponding to the weight of the machine in connection with which it is intended to be used, and thereafter, the element which maintains the predetermined spacing of the abutments may be withdrawn from at least one of the same thereby to release the spring. In other words, it is proposed, at the time of manufacture, to interlock or unite the cap and base members by a screw or its equivalent to initially maintain the elastic member under the proper degree of compression until the unit is placed beneath the machinery base, whereupon the screw element may be withdrawn from the base member, or withdrawn entirely from both members, as the case may be, to free the elastic member to absorb the vibration frequency of the machine.

A further object of the invention is to provide a simple, practical and reliable construction which may be readily initially assembled and installed with facility by the aid of simple tools.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which.

Similar references designate corresponding parts throughout the several figures of the drawing.

Figure 1:
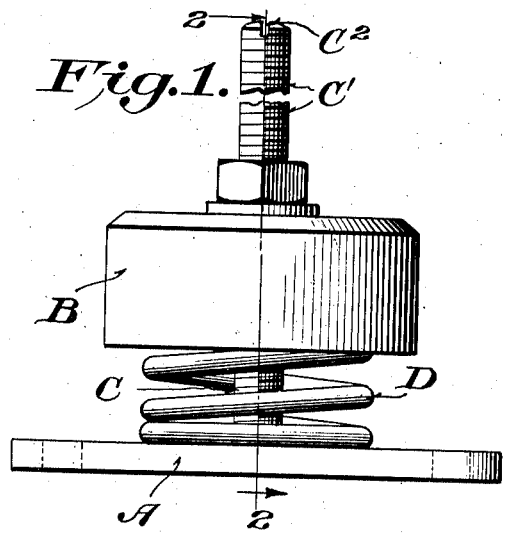
Figure 1 is a side elevation of a damping unit embodying the present invention.

The present invention includes in its organization a base A, a cap B and a threaded member C for connecting the cap and base. A spring or equivalent elastic element D is confined between the base A and the cap B. The base is internally threaded as at A' and the cap is internally threaded as at B' to receive the threaded member or screw C. As will be apparent from the drawing, the said screw C does not pass entirely through the base A, but the cap B may be turned or rotated on the screw thereby to compress the spring D or its equivalent to the desired degree.

The screw C is of sufficient length to project or extend upwardly above the cap B to provide an extension C' which permits of centering a portion of the machinery base M thereon. And, at its upper end the screw is preferably provided with a slot $C^2$ to permit of its manipulation by means of a screw driver or equivalent tool.

Figure 2:
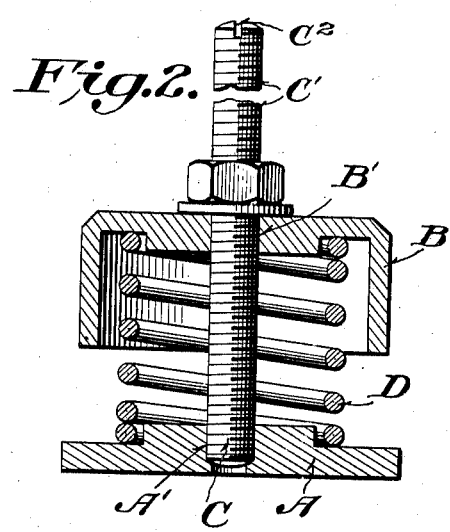
Figure 2 is a vertical sectional view of the damper shown in Figure 1, and as it leaves the place of manufacture.
Figure 3:
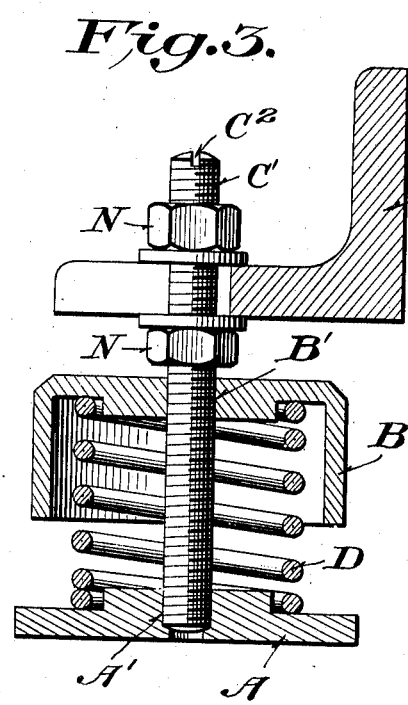
Figure 3 is a vertical sectional view illustrating the invention as it is placed beneath the machinery base.

In practice the unit is assembled as shown in Figures 1 and 2 at the place of manufacture and it is shipped into the field for installation purposes in the condition shown.

Figure 4:
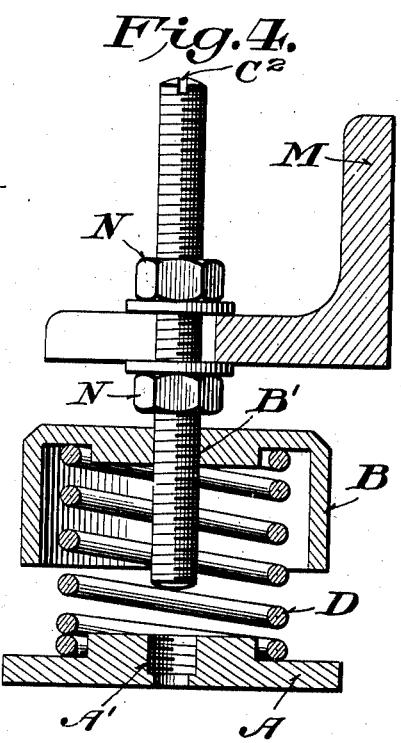
Figure 4 is a view illustrating the manner in which the threaded member or screw may be withdrawn from the base after the machine has been set thereon to free the spring or elastic member for vibration absorption.

At the installation site the base A may be secured to the floor or the like, and it will, of course, be understood that several damping units may be aligned and placed at intervals under the appropriate portions of the machinery base M. The extension C' of the screw is intended to pass through an opening or enter a notch in the machinery base M so that the said base may be readily mounted on the damping unit or units. After the machinery base is properly positioned on one or more of the damping units the screw C may be manipulated or turned by inserting a suitable tool in the slot $C^2$ at the head of the screw so as to withdraw the same from at least one of the members, for example, the base A as illustrated in Figure 4. Thus, it will be apparent that the spring or elastic element D will be free to absorb the forced vibration frequency of the machine which it supports.

It will, of course, be understood that the extension of the screw C may be provided with suitable adjusting nuts N to clamp the machinery base thereto in cases where the screw C is left in engagement with the cap B to constitute a portion of the means for anchoring and adjusting the machinery base to the damper. On the other hand, if the construction is such that other anchoring means are desired to be employed between the machinery base M and the cap B, the screw C may be entirely withdrawn. In any event, however, when the machine to be isolated is mounted on the damping units the screw C is manipulated to release the base A and cap B from the relation in which they were placed at the time of manufacture.

From the foregoing it will be apparent that the present invention provides a simple and practical means for initially assembling the unit and subsequently installing the same and it is thought that the features and advantages of the invention will be readily apparent to those skilled in the art without further description and without departing from the scope of the appended claims.

We claim:

1. A vibration damper for supporting machinery and the like comprising a base member in the form of a disc having a uniformly flat bottom face and provided with threaded socket opening through the top thereof to receive the lower end of a screw element, said socket having a shoulder at its bottom to be engaged by the lower end of the screw element to prevent the lower end of the latter from passing through the base and to enable the screw to be engaged tightly with said base member, a screw element threaded at its lower end in said socket, a cap member threaded on said screw element for adjustment toward and away from the base member, an elastic element interposed between said base and cap elements to be adjustably compressed by screwing of the cap member on said screw element toward the base member and to be released to urge the cap member upwardly relative to the base member by unscrewing the screw element from the base member, said screw element extending above the cap member, having at least one nut threaded thereon on which to support a machine or the like for vertical adjustment relative to the cap member when the screw element is unscrewed from the base member and remains threaded in the cap member, and said cap member being adjustable on the screw element while the machine is supported by said nut to vary the compression of said elastic member.

2. A vibration damper for supporting machinery bases and the like, comprising a base member having a threaded socket, a cap member having a central threaded opening, an elongated screw threaded element having its intermediate threads adapted to permanently engage with the central threaded opening of the cap and also having its lower threaded end detachably engaging with the threaded socket of the base member whereby the cap and base may be temporarily connected, an elastic element interposed between said base and cap elements and adapted to be compressed therebetween when said base and cap are temporarily connected and to be released by unscrewing the screw element from said base whereby when the cap is free of the base, it can resiliently support the machine base, said screw element normally and permanently extending above the cap member and forming means for anchoring a machine base thereto, and a nut on the upper end of said threaded element for engaging a portion of the machinery base to clamp the same in fixed position on the cap member while the same is resiliently supported by said elastic element.

WERNER GENEST.
HELMUT HARTZ.